(12) United States Patent
Shimizu et al.

(10) Patent No.: US 6,723,458 B2
(45) Date of Patent: Apr. 20, 2004

(54) MAGNETIC RECORDING MEDIUM, METHOD OF MANUFACTURE THEREFOR, AND MAGNETIC READ/WRITE APPARATUS

(75) Inventors: Kenji Shimizu, Ichihara (JP); Akira Sakawaki, Ichihara (JP); Hui Yang, Ichihara (JP); Hiro Mochizuki, Ichihara (JP); Hiroshi Sakai, Ichihara (JP); Takashi Hikosaka, Tokyo (JP); Futoshi Nakamura, Ichikawa (JP)

(73) Assignees: Showa Denko K.K., Tokyo (JP); Toshiba Corporation, Tokyo (JP)

( * ) Notice: Subject to any disclaimer, the term of this patent is extended or adjusted under 35 U.S.C. 154(b) by 0 days.

(21) Appl. No.: 10/218,570

(22) Filed: Aug. 15, 2002

(65) Prior Publication Data

US 2003/0104250 A1 Jun. 5, 2003

Related U.S. Application Data

(60) Provisional application No. 60/314,669, filed on Aug. 27, 2001.

(30) Foreign Application Priority Data

Aug. 17, 2001 (JP) ..................... P2001-247825

(51) Int. Cl.$^7$ .............. G11B 5/66; G11B 5/70
(52) U.S. Cl. ............ 428/694 TS; 428/694 TM; 428/900; 427/128; 427/131
(58) Field of Search ........... 428/694 T, 694 TM, 428/900, 694 TS; 427/128, 131

(56) References Cited

U.S. PATENT DOCUMENTS

2002/0037441 A1 * 3/2002 Okuyama et al. ...... 428/694 TS

FOREIGN PATENT DOCUMENTS

| JP | 59-61012 A | 4/1984 |
|----|------------|--------|
| JP | 6-28652 A | 2/1994 |
| JP | 6-103554 A | 4/1994 |
| JP | 6-180834 A | 6/1994 |
| JP | 6-215941 A | 8/1994 |
| JP | 8-31638 A | 2/1996 |
| JP | 8-77544 A | 3/1996 |
| JP | 11-283227 A | 10/1999 |
| JP | 2001-098360 A | 4/2001 |
| JP | 2001-101643 A | 4/2001 |
| JP | 2001-167423 A | 6/2001 |

OTHER PUBLICATIONS

Patent Abstracts of Japan, abstracting JP-A-2001-101643, Apr. 13, 2001.
Patent Abstracts of Japan, abstracting JP-A-2001-167423, Jun. 22, 2001.
Patent Abstracts of Japan, abstracting JP-A-11-283227, Oct. 15, 1999.

(List continued on next page.)

Primary Examiner—Holly Rickman
(74) Attorney, Agent, or Firm—Sughrue Mion, PLLC

(57) ABSTRACT

A magnetic recording medium that is capable of recording and reading back information at a higher density by improving the read/write characteristics and thermal stability, a method of manufacture therefor, and a magnetic read/write apparatus are provided. This magnetic recording medium, comprises an orientation control film that controls the orientation of a film provided directly thereabove, a perpendicular magnetic film, of which the axis of easy magnetization is generally oriented perpendicular to a non-magnetic substrate, and a protective film, that are provided on the non-magnetic substrate, wherein the perpendicular magnetic film is made of a material which contains Co, Cr, Pt and Cu, the Cr content being 16 at % to 24 at % and the Cu content being 0.1 at % to 4 at %, and a coercive force (Hc) of the perpendicular magnetic film being at least 3000 (Oe), negative nucleation field (-Hn) being 0 (Oe) to 2500 (Oe), and a ratio of residual magnetization (Mr) to saturation magnetization (Ms) being at least 0.85.

7 Claims, 4 Drawing Sheets

OTHER PUBLICATIONS

Patent Abstracts of Japan, abstracting JP-A-2001-098360, Apr. 10, 2001.
Patent Abstracts of Japan, abstracting JP-A-59-61012, Apr. 7, 1984.
Patent Abstracts of Japan, abstracting JP-A-6-215941, Aug. 5, 1994.
Patent Abstracts of Japan, abstracting JP-A-8-31638, Feb. 2, 1996.
Patent Abstracts of Japan, abstracting JP-A-6-28652, Feb. 4, 1994.
Patent Abstracts of Japan, abstracting JP-A-6-103554, Apr. 15, 1994.
Patent Abstracts of Japan, abstracting JP-A-6-180834, Jun. 28, 1994.
Patent Abstracts of Japan, abstracting JP-A-8-77544, Mar. 22, 1996.

* cited by examiner

MAGNETIC RECORDING MEDIUM, METHOD OF MANUFACTURE THEREFOR, AND MAGNETIC READ/WRITE APPARATUS

CROSS-REFERENCE TO RELATED APPLICATION

This application claims the benefit pursuant to 35 U.S.C. §119(e)(1) of U.S. Provisional Application, No. 60/314,669 filed Aug. 27, 2001.

BACKGROUND OF THE INVENTION

1. Field of the Invention

The present invention relates to a magnetic recording medium, a method of manufacture therefor, and a magnetic read/write apparatus using the magnetic recording medium.

2. Description of the Related Art

Most magnetic recording media now commercially available are in-plane magnetic recording media wherein the axis of easy magnetization in a magnetic film is generally oriented parallel to the substrate.

In an in-plane magnetic recording medium, there is a possibility that the volume of recording bits will be too small when the recording density is increased and magnetic read/write characteristics are deteriorated by the thermal fluctuation effect. Also medium noise increases under the influence of diamagnetism at the boundary of recording bits when the recording density is increased.

In a so-called perpendicular magnetic recording medium of which the axis of easy magnetization in the magnetic film is generally oriented perpendicular to the substrate, in contrast, recording magnetic domains that have clear boundaries can be formed due to less influence of demagnetizing field at the boundary of recording bits even when the recording density is increased, and therefore noise can be reduced. Moreover, since the recording density can be increased even if the volume of bits is relatively large, the perpendicular magnetic recording medium has high thermal stability, resulting in much attention being given to the perpendicular magnetic recording medium. Consequently, structure of a medium suitable for use in perpendicular magnetic recording has been proposed.

Recently, there has been increasing demand for high-density recording in magnetic recording media. For this reason, a magnetic recording medium has been proposed in which a layer made of a soft magnetic material, called a soft back layer, is provided between a perpendicular magnetic film that serves as a recording layer and a substrate so as to improve the efficiency of the flow of the magnetic flux between a single pole type head and the magnetic recording medium, in order to use the single pole type head which has high capability of writing in the perpendicular magnetic film.

However, even when the soft back layer is provided, the magnetic recording medium does not have satisfactory performance in read/write characteristics, thermal stability, and the resolution, and therefore a magnetic recording medium that is improved in these characteristics has been desired.

Japanese Patent Application, First Publication, No. Sho 59-61012 proposes to add Cu as a third element to a perpendicular magnetic film made of a CoCr material. However, this magnetic recording medium has small perpendicular magnetic anisotropy constant Ku and was insufficient in read/write characteristics and thermal stability.

BRIEF SUMMARY OF THE INVENTION

Under the above-described circumstances, the present invention has been made, and an object thereof is to provide a magnetic recording medium that is capable of recording and reading back information at a higher density by improving the read/write characteristics and thermal stability, a method of manufacture therefor, and a magnetic read/write apparatus.

To achieve the object described above, the present invention employed the following constructions.

The magnetic recording medium of the present invention comprises at least an orientation control film that controls the orientation of a film provided directly thereabove, a perpendicular magnetic film, of which the axis of easy magnetization is generally oriented perpendicular to a non-magnetic substrate, and a protective film, that are provided on the non-magnetic substrate, wherein the perpendicular magnetic film is made of a material which contains Co, Cr, Pt and Cu, the Cr content being 16 at % to 24 at % and the Cu content being 0.1 at % to 4 at %, and a coercive force (Hc) of the perpendicular magnetic film being at least 3000 (Oe), negative nucleation field (−Hn) being 0 (Oe) to 2500 (Oe), and a ratio of residual magnetization (Mr) to saturation magnetization (Ms) being at least 0.85.

The perpendicular magnetic film preferably has a Cr content from 18 at % to 24 at %, a Pt content from 14 at % to 24 at %, and a Cu content from 0.1 at % to 3 at %.

The perpendicular magnetic film may comprise at least one of CoCrPtCu alloy, CoCrPtCuTa alloy, CoCrPtCuB alloy and CoCrPtCuTaB alloy.

In the present invention, a hard magnetic film made of a hard magnetic material can be provided between the non-magnetic substrate and the soft magnetic undercoat film.

In the present invention, a magnetizing stabilization film made of a soft magnetic material can be provided above the perpendicular magnetic film.

The method of manufacturing a magnetic recording medium of the present invention comprises forming at least an orientation control film that controls the orientation of a film provided directly thereabove, a perpendicular magnetic film of which axis of easy magnetization is generally oriented perpendicular to a non-magnetic substrate, and a protective film, on the non-magnetic substrate, while controlling so that the perpendicular magnetic film is made of a material which contains Co, Cr, Pt and Cu, the Cr content is 16 at % to 24 at % and the Cu content is 0.1 at % to 4 at %, and that a coercive force (Hc) of the perpendicular magnetic film is at least 3000 (Oe), negative nucleation field (−Hn) is 0 (Oe) to 2500 (Oe), and a ratio of residual magnetization (Mr) to saturation magnetization (Ms) is at least 0.85.

The magnetic read/write apparatus of the present invention comprises a magnetic recording medium and a magnetic head that records information on the magnetic recording medium and reads back the information, wherein the magnetic head is a single pole type head and the magnetic recording medium comprises at least an orientation control film that controls the orientation of a film provided directly thereabove, a perpendicular magnetic film, of which the axis of easy magnetization is generally oriented perpendicular to a non-magnetic substrate, and a protective film, that are provided on the non-magnetic substrate, wherein the perpendicular magnetic film is made of a material which contains Co, Cr, Pt and Cu, the Cr content being 16 at % to 24 at % and the Cu content being 0.1 at % to 4 at %, and a coercive force (Hc) of the perpendicular magnetic film being at least 3000 (Oe), negative nucleation field (−Hn) being 0 (Oe) to 2500 (Oe), and a ratio of residual magnetization (Mr) to saturation magnetization (Ms) is at least 0.85.

As described above, in the magnetic recording medium of the present invention, the perpendicular magnetic film is made of a material which contains Co, Cr, Pt and Cu, the Cr content being 16 at % to 24 at % and the Cu content being 0.1 to 4 at %. Therefore, read/write characteristics can be improved, and moreover, and thermal stability can be improved.

BRIEF DESCRIPTION OF THE DRAWINGS

FIG. 6A shows the entire structure.

DETAILED DESCRIPTION OF THE INVENTION

Figure 1:
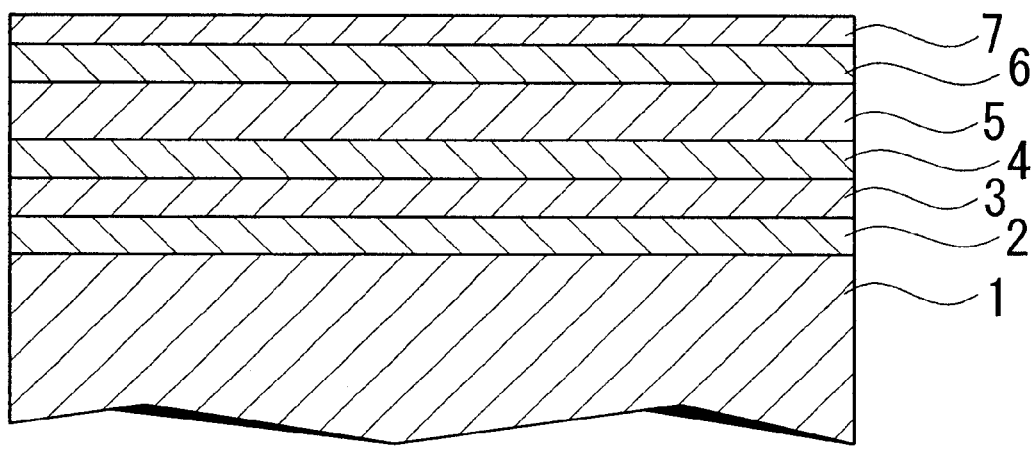
FIG. 1 is a partially sectional view showing the first embodiment of a magnetic recording medium of the present invention.

FIG. 1 shows the first embodiment of the present invention. The magnetic recording medium shown here has a structure in which a soft magnetic undercoat film 2, an orientation control film 3, an intermediate film 4, a perpendicular magnetic film 5, a protective film 6, and a lubricating film 7 are formed on a non-magnetic substrate 1.

As the non-magnetic substrate 1, a metallic substrate comprising a metallic material such as aluminum or aluminum alloy may be used, and a non-metallic substrate comprising a non-metallic material such as glass, ceramic, silicon, silicon carbide or carbon may be used.

Examples of the glass substrate include amorphous glass substrate and crystallized glass substrate. As the amorphous glass, general-purpose soda-lime glass, aluminocate glass and aluminosilicate glass can be used. As the crystallized glass, lithium-type crystallized glass can be used. As the ceramic substrate, a sintered body containing general-purpose aluminum oxide, aluminum nitride or silicon nitride as the major constituent, or a fiber-reinforced products thereof can be used.

As the non-magnetic substrate 1, it is possible to use one of the above-mentioned metal substrates or non-metal substrates on whose surface a NiP film has been formed using a plating method, a sputtering method, or the like The soft magnetic undercoat film 2 is provided in order to increase the perpendicular component of the magnetic flux from the magnetic head and to establish more firmly the magnetization of the perpendicular magnetic film 5, that records the information, in a direction perpendicular to the substrate 1.

This action becomes more prominent when using a single pole type head for perpendicular recording as a read/write magnetic head.

The soft magnetic undercoat film 2 is made of a soft magnetic material. As the material thereof, a material containing Fe, Ni or Co can be used.

Examples of the material of the soft magnetic undercoat film 2 include FeCo alloys (FeCo, FeCoV and the like), FeNi alloys (FeNi, FeNiMo, FeNiCr, FeNiSi and the like), FeAl alloys (FeAl, FeAlSi, FeAlSiCr, FeAlSiTiRu, FeAlO and the like), FeCr alloys (FeCr, FeCrTi, FeCrCu and the like), FeTa alloys (FeTa, FeTaC, FeTaN and the like), FeMg alloys (FeMgO and the like), FeZr alloys (FeZrN and the like), FeC alloys, FeN alloys, FeSi alloys, fen alloys, FeNb alloys, FeHf alloys, and FeB alloys.

There can also be used a material having an Fe content of at least 60 at % containing fine crystals such as FeAlO, FeMgO, FeTaN, FeZrN or the like. In addition, it can also have a granular structure in which the fine crystals are dispersed in a matrix.

As the material of the soft magnetic undercoat film 2, a Co alloy having an amorphous structure, which contains at least 80 at % of Co and also contains at least one of Zr, Nb, Ta, Cr, Mo or the like, can be used.

For example, CoZr, CoZrNb, CoZrTa, CoZrCr, and CoZrMo alloys can be used advantageously as the material.

The coercive force Hc of the soft magnetic undercoat film 2 is preferably not more than 200 (Oe) (preferably not more than 50 (Oe)).

The coercive force Hc that exceeds the above range is not preferable for the following reason. That is, the soft magnetic characteristics become insufficient and the read back wave does not become a so-called rectangular wave, but become a distorted wave.

The saturation magnetic flux density Bs of the soft magnetic undercoat film 2 is preferably at least 0.6 T (and preferably at least 1 T). A Bs that below the above range is not preferable for the following reason. That is, the read back wave does not become a so-called rectangular wave, but become a distorted wave.

Specifically, Bs·t, that is, the product of the saturation magnetic flux density Bs of the material that forms the soft magnetic undercoat film 2 and the film thickness t of the soft magnetic undercoat film 2, is preferably at least 40 T·nm (more preferably at least 60 T·nm). A Bs·t that is below the above range is not preferable for the following reason. That is, the read back wave is distorted and OW characteristics (over-write characteristics) deteriorate.

It is preferable that the surface of the soft magnetic undercoat film 2 (the plane of the orientation control film 3 side) is partially or completely oxidized.

Consequently, magnetic magnetic fluctuation of the surface of the soft magnetic undercoat film 2 can be reduced, and therefore, read/write characteristics of the magnetic recording medium can be improved by reducing noise caused by the magnetic fluctuations. Also read/write characteristics can be improved by refining crystal grains of the orientation control film 3 formed on the soft magnetic undercoat film 2.

The oxidized surface portion of the soft magnetic undercoat film 2 can be formed by a method in which the soft magnetic undercoat film 2 is exposed to a gas that includes oxygen after forming the soft magnetic undercoat film 2, or a method that introduces oxygen into the process gas when forming the surface portion of the soft magnetic undercoat film 2 can be used.

Specifically, in the case in which the surface of the soft magnetic undercoat film 2 is exposed to an oxygen-containing gas, it may be allowed to stand in oxygen gas, or in a gas obtained by diluting oxygen with argon or nitrogen, for about 0.3 to 20 seconds. Also the method of exposing the soft magnetic undercoat film 2 to air can be employed.

In particular, when using a gas obtained by diluting oxygen with argon or nitrogen, stable manufacture can be conducted because it becomes easy to control the degree of oxidization of the surface of the soft magnetic undercoat film 2.

In the case in which oxygen is introduced into a film-forming gas of the soft magnetic undercoat film 2, for example, when using a sputtering method as the film-forming method, sputtering may be conducted using a process gas containing oxygen introduced therein during a portion of the film-forming time. As the process gas, for example, a gas obtained by mixing argon with about 0.05 to 50 vol % (preferably 0.1 to 20 vol %) of oxygen is preferably used.

The orientation control film 3 is a film provided for controlling the orientation and crystal grain diameter of the intermediate film 4 provided directly thereabove and the perpendicular magnetic film 5. The material of the orientation control film 3 is not specifically limited, but preferably has a hcp structure, a fcc structure, or an amorphous structure. In particular, a Ru alloy, a Ni alloy, and a Co alloy are preferred.

The thickness of the orientation control film 3 is preferably from 0.5 to 40 nm (more preferably from 1 to 20 nm). When the film thickness of the orientation control film 3 is within a range from 0.5 to 40 nm (preferably from 1 to 20 nm), the perpendicular orientation of the perpendicular magnetic film 5 becomes substantially better and the distance between the magnetic head and the soft magnetic undercoat film 2 becomes small during recording, and therefore read/write characteristics can be enhanced without deteriorating the resolution of the read back signal.

When the thickness falls below the above range, the perpendicular orientation of the perpendicular magnetic film 5 is degraded, and therefore read/write characteristics and the thermal stability deteriorate.

Also when the thickness exceeds the range described above, the magnetic grain size of the perpendicular magnetic film 5 increases and the noise characteristics deteriorate, which is not preferable. Since the distance between the magnetic head and the soft magnetic undercoat film 2 becomes large during recording, the resolution of the read back signal and the output become degraded, which is not preferable.

Since the surface morphology of the orientation control film 3 influences the surface morphology of the perpendicular magnetic film 5 and protective film 6, the mean surface roughness Ra of the orientation control film 3 is preferably set to 2 nm or less in order to reduce the flying height of the magnetic head during recording and read back by reducing the surface unevenness of the magnetic recording medium.

Control of the mean surface roughness Ra to 2 nm or less makes it possible to reduce the surface unevenness of the magnetic recording medium, thereby to sufficiently reduce the flying height of the magnetic head during recording and read back and to enhance the recording density.

The orientation control film 3 can contain at least one of oxygen and nitrogen. A method that introduces oxygen or nitrogen into the film-forming gas (process gas) when forming the orientation control film 3 can be used.

For example, when using a sputtering method as the film-forming method, a gas obtained by mixing argon with about 0.05 to 50 vol % (preferably 0.1 to 20 vol %) of oxygen or a gas obtained by mixing argon with about 0.01 to 20 vol % (preferably 0.02 to 10 vol %) of nitrogen is preferably used as the film-forming gas.

Fine crystal grains are formed in the orientation control film 3 by introducing oxygen or nitrogen.

It is preferable to use, in the intermediate film 4, a material having an hcp structure. It is preferable to use, in the intermediate film 4, a CoCr alloy, a CoCrX$_1$ alloy or a CoX$_1$ alloy (XI: at least one of Pt, Ta, Zr, Ru, Nb, Cu, Re, Ni, Mn, Ge, Si, O, N and B).

The Co content of the intermediate film 4 is preferably within a range from 30 to 70 at %.

The thickness of the intermediate film 4 is preferably set to not more than 20 nm (and preferably not more than 10 nm) in order to prevent deterioration of read/write characteristics due to coarsening of magnetic grains in the perpendicular magnetic film 5 and degrading of the resolution due to an increase in distance between the magnetic head and the soft magnetic undercoat film 2.

Formation of the intermediate film 4 makes it possible to enhance the perpendicular orientation of the perpendicular magnetic film 5, to enhance the coercive force of the perpendicular magnetic film 5, and to further improve the read/write characteristics and the thermal stability.

The perpendicular magnetic film 5 is a film in which the axis of easy magnetization is generally oriented perpendicular to the substrate.

The perpendicular magnetic film 5 is made of a material containing Co, Cr, Pt, and Cu and has a Cr content of 16 at % to 24 at % (preferably 18 at % to 24 at %) and a Cu content of 0.1 at % to 4 at % (preferably 0.1 at % to 3 at %).

A Cr content of less than 16 at % is not preferable for the following reason. That is, since exchange coupling between magnetic grains increases, the magnetic cluster size increases and the medium noise increases. The Cr content of more than 24 at % is not preferable for the following reason. That is, the ratio of residual magnetization (Mr) to saturation magnetization (Ms), Mr/Ms, and the coercive force Hc, are reduced.

When the Cu content is less than 0.1 at %, the effect of the addition of Cu cannot be obtained. The Cu content of more than 4 at % is not preferable because magnetic grains become coarse and read/write characteristics deteriorate.

The perpendicular magnetic film 5 preferably has a Pt content of 14 at % to 24 at %.

When the Pt content is less than 14 at %, the perpendicular magnetic anisotropy constant Ku decreases and the effect of the addition of Pt cannot be obtained. That is, it is not preferred because the effect of improving a ratio of residual magnetization (Ms) to saturation magnetization (Mr) and the effect of increasing negative nucleation field (−Hn) become insufficient. The Pt content of more than 24 at % is not preferred because noise increases.

The material of the perpendicular magnetic film 5 is particularly preferably a CoCrPtCu alloy, a CoCrPtCuB alloy, a CoCrPtCuTa alloy or a CoCrPtCuTaB alloy.

When using the CoCrPtCuB alloy, the B content is preferably not more than 4 at % (and more preferably not more than 3 at %). A B content of more than 4 at % is not preferred because a coercive force and Mr/Ms (a ratio of residual magnetization Ms to saturation magnetization Mr) are reduced.

When using the CoCrPtCuTa alloy, the Ta content is preferably not more than 4 at % (and more preferably not more than 3 at %). The Ta content of more than 4 at % is not preferred because the coercive force and Mr/Ms are reduced.

When using the CoCrPtCuTaB alloy, the total content of B and Ta is preferably not more than 4 at % (and more preferably not more than 3 at %). The total content of B and Ta of more than 4 at % is not preferred because the coercive force and Mr/Ms are reduced.

The perpendicular magnetic film 5 can have a single layer structure made of the CoCrPtCu material described above, or it can have a multiple layer structure in which a layer comprising the CoCrPt alloy material and a layer comprising the CoCrPtCu alloy material are laminated.

Also, a perpendicular magnetic film can have a multiple layer structure in which a Co alloy (Co, CoCr, CoB, Co—$SiO_2$ or the like) layer and a Pd alloy (Pd, PdB, Pd—$SiO_2$ or the like) layer are laminated.

Also, a perpendicular magnetic film can have a multiple layer structure in which the Co alloy and a Pt alloy (Pt, PtB, Pt—$SiO_2$ or the like) layer are laminated.

Furthermore, a perpendicular magnetic film can have a multiple layer structure including an amorphous material layer made of TbFeCo and the CoCrPtCu alloy layer.

As the effect of the addition of Cu, an improvement in coercive force, an improvement in Mr/Ms, and an increase in negative nucleation field (–Hn) can be mentioned.

Table 1 shows characteristics obtained when using the CoCrPtCu alloy as the material of the perpendicular magnetic film 5 and characteristics obtained when using the CoCrPt alloy excluding Cu from the above material.

3000 (Oe) is not preferable because it is not suitable for increasing the recording density and is also inferior in thermal stability.

The negative nucleation field (–Hn) of the perpendicular magnetic film 5 is preferably at least 0 (Oe) and not more than 2500 (Oe). The magnetic recording medium having the negative nucleation field (–Hn) of less than 0 (Oe) is not preferable because of poor thermal stability.

The ratio of residual magnetization (Mr) to saturation magnetization (Ms) of the perpendicular magnetic film 5 is set to at least 0.85. The magnetic recording medium having Mr/Ms of less than 0.85 is not preferable because it is inferior in thermal stability.

In the following, the negative nucleation field (–Hn) will be described.

Figure 2:
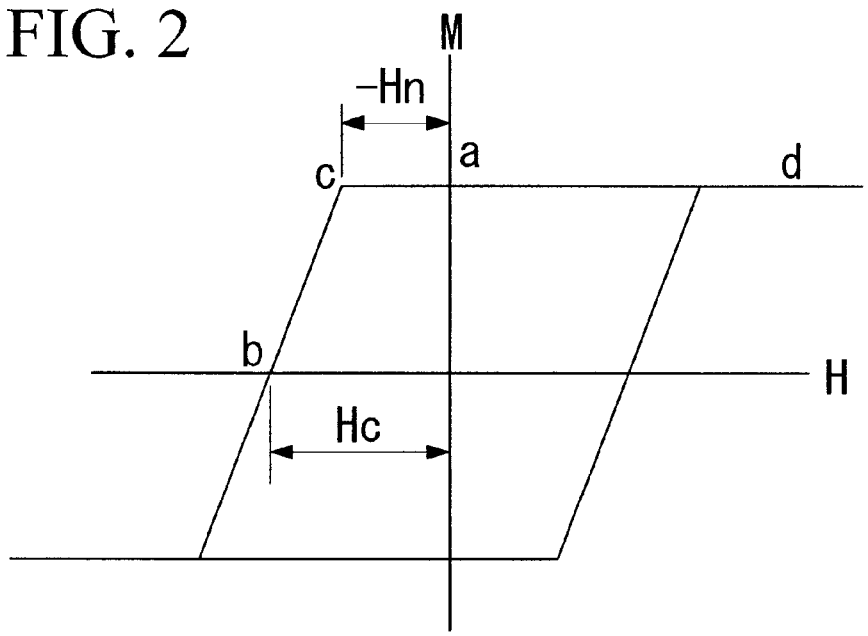
FIG. 2 is a graph showing an example of a MH curve.

As shown in FIG. 2, the negative nucleation field (–Hn) is the numerical value represented by the distance (Oe) between the point "a" and the point "c" in a MH curve, where the point "a" is a point at which the external magnetic field becomes 0 in the process of decreasing the external magnetic field from a saturated state of the magnetization, the point "b" is a point at which the magnetization becomes 0, and the point "c" is a point of intersection of a tangent which touches the MH curve at the point "a" and a line which shows saturation magnetization.

Moreover, the negative nucleation field (–Hn) takes a positive value in the case in which the point "c" is in a region

TABLE 1

| | PERPENDICULAR MAGNETIC FILM | | READ/WRITE CHARACTERISTICS | THERMAL | MAGNETOSTATIC | | |
|---|---|---|---|---|---|---|---|
| | COMPOSITION (at %) | THICKNESS (nm) | ERROR RATE $(10^{-x})$ | STABILITY (%/DECADE) | CHARACTERISTICS | | |
| | | | | | Hc (Oe) | Mr/Ms | –Hn (Oe) |
| Example 1 | 59Co—22Cr—17Pt—2Cu | 25 | 5.6 | –0.5 | 4490 | 0.98 | 1220 |
| Example 2 | 61Co—22Cr—17Pt | 25 | 5.2 | –1.8 | 3700 | 0.83 | — |
| Example 3 | 57Co—24Cr—17Pt—2Cu | 25 | 6.9 | –1.7 | 3850 | 0.86 | 150 |

As is apparent from Table 1, when using the CoCrPtCu alloy (Example 1), the coercive force Hc, Mr/Ms and negative nucleation field (–Hn) were improved, and the thermal stability was remarkably improved, as compared with the case of using the CoCrPt alloy (Example 2), although there was not a large difference in read/write characteristics.

Comparing the case where the Cr content was set to 22 at % using the CoCrPtCu alloy (Example 1) with the case in which the Cr content was set to 24 at % (Example 3), excellent read/write characteristics could be obtained in the case in which the Cr content was set to 24 at %.

It is believed that excellent read/write characteristics could be obtained because the Cr content could be set to a high value without deteriorating the thermal stability.

The thickness of the perpendicular magnetic film 5 is preferably set within a range from 3 to 60 nm (preferably from 5 to 40 nm). When the thickness of the perpendicular magnetic film 5 falls below the above range, sufficient magnetic flux cannot be obtained and the read back output is lowered. A thickness of more than the above is not preferable because magnetic grains in the perpendicular magnetic film 5 become coarse and read/write characteristics deteriorate.

Figure 3:
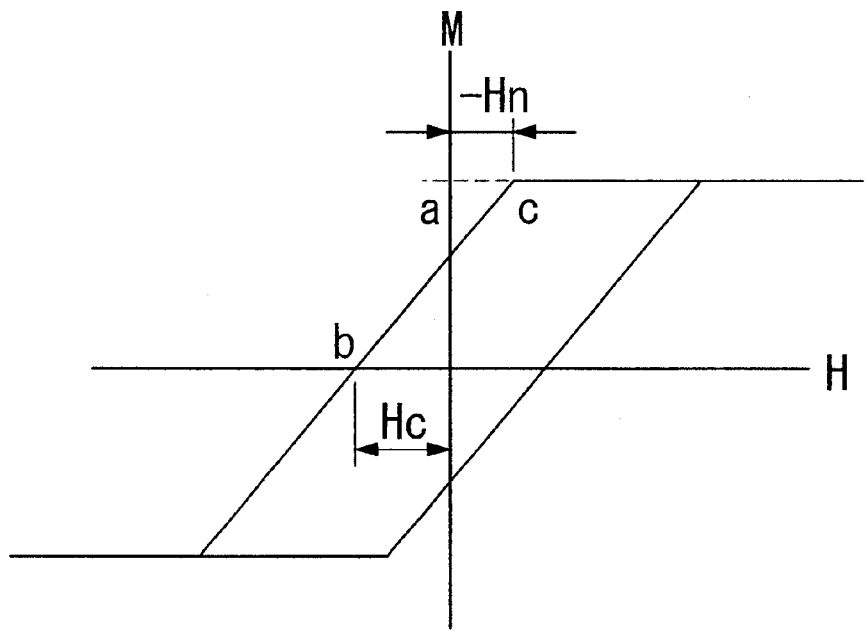
FIG. 3 is a graph showing another example of a MH curve.

The coercive force Hc of the perpendicular magnetic film 5 is preferably set to at least 3000 (Oe). The magnetic recording medium having the coercive force Hc of less than in which the external magnetic field becomes negative (see FIG. 2), and conversely, takes a negative value in the case in which the point "c" is in a region in which the external magnetic field becomes positive (see FIG. 3).

In the perpendicular magnetic film 5, the mean grain diameter of crystal grains is preferably within a range from 5 to 15 nm.

The mean grain diameter can be determined, for example, by observing crystal grains of the perpendicular magnetic film 5 by a TEM (transmission electron microscope) and image-processing the image observed.

The protective film 6 is for preventing corrosion of the perpendicular magnetic film 5, and at the same time, prevents damage to the medium surface when the magnetic head comes into contact with the medium. Conventionally known materials can be used and, for example, a material containing C, $SiO_2$, or $ZrO_2$ can be used.

The thickness of the protective film 6 is preferably within a range from 1 to 10 nm.

It is preferable to use, as a lubricating film 7, perfluoropolyether, fluorinated alcohol, fluorinated carboxylic acid, or the like.

In the magnetic recording medium with the above construction, the perpendicular magnetic film 5 is made of a material which contains Co, Cr, Pt and Cu, the Cr content being from 16 at % to 24 at %, and the Cu content being from 0.1 at % to 4 at %, and a coercive force (Hc) of the perpendicular magnetic film is at least 3000 (Oe), the negative nucleation field (−Hn) is 0 (Oe) to 2500 (Oe), and a ratio of residual magnetization (Mr) to saturation magnetization (Ms) is at least 0.85.

Therefore, excellent thermal stability can be obtained.

Furthermore, the Cr content can be set to a high value without deteriorating the thermal stability, and therefore noise can be reduced and read/write characteristics can be improved.

The thermal stability refers to a phenomenon wherein recording bits become unstable and thermal loss of recorded data occurs. In the magnetic read/write apparatus, this appears as damping over time of the read back output of recorded data.

In the present invention, when the perpendicular magnetic film has a multiple layer structure composed of plural layers, at least one of these layers may be provided with the construction of the perpendicular magnetic film 5 in the first embodiment described above.

Figure 4:
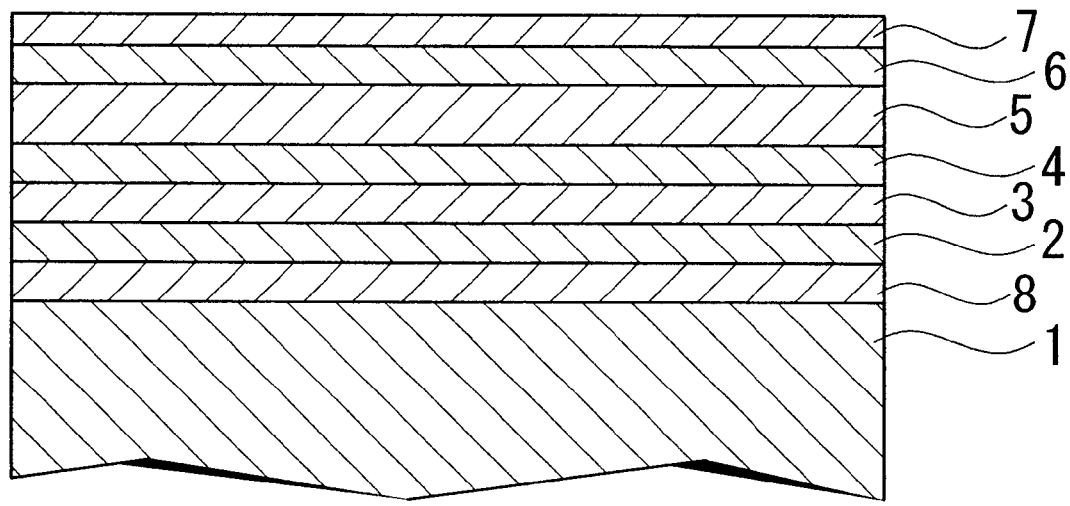
FIG. 4 is a partially sectional view showing the second embodiment of a magnetic recording medium of the present invention.

FIG. 4 shows the second embodiment of the magnetic recording medium of the present invention. In this magnetic recording medium, a hard magnetic film 8, of which magnetic anisotropy is mainly oriented in an in-plane direction, made of a hard magnetic material is provided between a non-magnetic substrate 1 and a soft magnetic undercoat film 2.

It is preferable to use, in the hard magnetic film 8, a CoSm alloy or a CoCrPtX$_2$ alloy (X$_2$: at least one of Pt, Ta, Zr, Nb, Cu, Re, Ni, Mn, Ge, Si, O, N and B).

The coercive force Hc of the hard magnetic film 8 is preferably at least 500 (Oe) (and more preferably at least 1000 (Oe)).

The thickness of the hard magnetic film 8 is preferably not more than 150 nm (and more preferably not more than 70 nm). A thickness of more than 150 nm of the hard magnetic film 8 is not preferable because the mean surface roughness Ra of the orientation control film 3 becomes larger.

The hard magnetic film 8 is preferably provided with such a construction that exchange coupling between the hard magnetic film and the soft magnetic undercoat film 2 is formed and the magnetic film is magnetized in the radial direction of the substrate.

By providing the hard magnetic film 8, formation of extremely large magnetic domains in the soft magnetic undercoat film 2 can be suppressed more effectively, and therefore the occurrence of spike noise due to magnetic domains can be prevented and the error rate during recording and read back can be sufficiently reduced.

To control the orientation of the hard magnetic film 8, an undercoat film made of a Cr alloy or a B2 structural material may be formed between a non-magnetic substrate 1 and a hard magnetic film 8.

Figure 5:
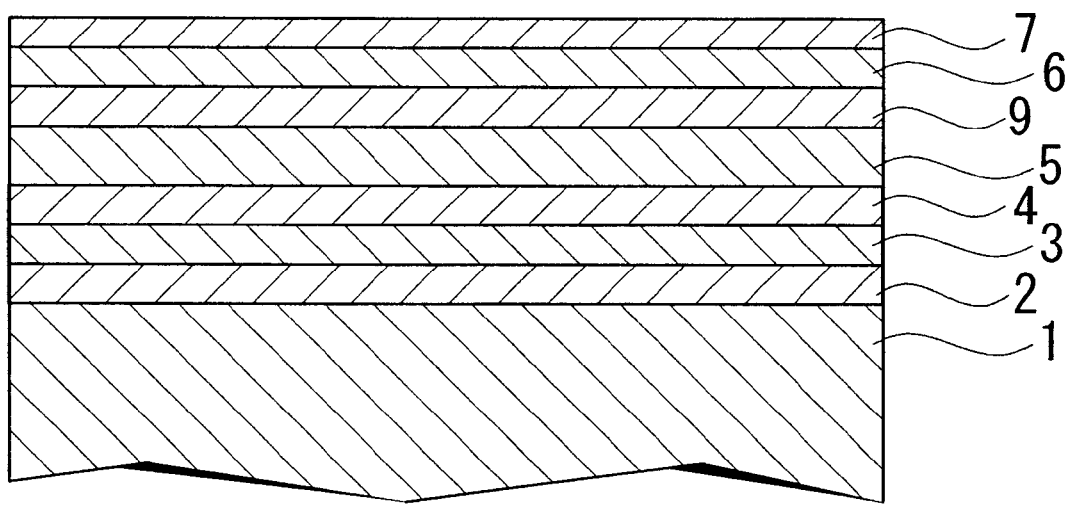
FIG. 5 is a partially sectional view showing the third embodiment of a magnetic recording medium of the present invention.

FIG. 5 shows the third embodiment of the magnetic recording medium of the present invention. In this magnetic recording medium, a magnetizing stabilization film 9 made of a soft magnetic material is provided between a perpendicular magnetic film 5 and a protective film 6.

Examples of the material of the magnetizing stabilization film 9 include FeCo alloys (FeCo, FeCoV and the like), FeNi alloys (FeNi, FeNiMo, FeNiCr, FeNiSi and the like), FeAl alloys (FeAl, FeAlSi, FeAlSiCr, FeAlSiTiRu, FeAlO and the like), FeCr alloys (FeCr, FeCrTi, FeCrCu and the like), FeTa alloys (FeTa, FeTaC, FeTaN and the like), FeMg alloys (FeMgO and the like), FeZr alloys (FeZrN and the like), FeC alloys, FeN alloys, FeSi alloys, FeP alloys, FeNb alloys, FeHf alloys, and FeB alloys.

There can also be used a material having an Fe content of at least 60 at % containing fine crystals such as FeAlO, FeMgO, FeTaN, FeZrN or the like. In addition, it can also have a granular structure in which the fine crystals are dispersed in a matrix.

As the material of the magnetizing stabilization film 9, a Co alloy having an amorphous structure, which contains 80 at % or higher of Co and also contains at least one of Zr, Nb, Ta, Cr, Mo or the like, can be used.

For example, CoZr, CoZrNb, CoZrTa, CoZrCr, and CoZrMo alloys can be used advantageously as the material.

The coercive force Hc of the magnetizing stabilization film 9 is preferably not more than 200 (Oe) (and more preferably not more than 50 (Oe)).

The saturation magnetic flux density Bs of the magnetizing stabilization film 9 is preferably at least 0.4 T (and more preferably at least 1 T).

Bs·t, that is, the product of the saturation magnetic flux density Bs of the material and the film thickness t of the magnetizing stabilization film 9, is preferably at least 7.2 T·nm. Bs·t that exceeds the above range is not preferable because the read back output is reduced.

By providing a magnetizing stabilization film 9 made of a soft magnetic film between a perpendicular magnetic film 5 and a protective film 6, an improvement in thermal stability and an increase in read back output can be achieved.

This reason for this is believed to be as follows. That is, the fluctuation of the magnetization in the surface of the perpendicular magnetic film 5 is stabilized by the magnetizing stabilization film 9, so that leakage flux is not influenced by this fluctuation and the read back output increases. In addition, by providing the magnetizing stabilization film 9, the magnetization of the perpendicular magnetic film 5 in the perpendicular direction and the magnetization of the soft magnetic undercoat film 2 and the magnetizing stabilization film 9 in the in-plane direction form a closed circuit. Due to this action, excellent thermal stability is obtained because the magnetization of the perpendicular magnetic film 5 is established more strongly in the perpendicular direction.

In the manufacture of the magnetic recording medium having the construction described above, a soft magnetic undercoat film 2, an orientation control film 3, an intermediate film 4 and a perpendicular magnetic film 5 are formed in sequence on a substrate 1 by a sputtering method, vacuum deposition, ion plating or the like.

An oxidizing treatment can be carried out on the surface of the soft magnetic undercoat film 2 and the orientation control film 3, if necessary.

In the formation of the perpendicular magnetic film 5, the material, which contains Co, Cr, Pt and Cu, has a Cr content of 16 at % to 24 at % and a Cu content of 0.1 at % to 4 at %, is preferably used.

Also the film-forming conditions are selected so that a coercive force (Hc) of the perpendicular magnetic film is at least 3000 (Oe), negative nucleation field (−Hn) is 0 (Oe) to 2500 (Oe), and a ratio of residual magnetization (Mr) to saturation magnetization (Ms) is at least 0.85.

The protective film 6 is preferably formed by a plasma CVD method, an ion beam method, a sputtering method or the like.

To form a lubricating film 7, conventionally well-known methods such as dip coating methods and spin coating methods can be employed.

In the manufacture of the magnetic recording medium shown in FIG. 4, a hard magnetic film 8 is formed between a substrate 1 and a soft magnetic undercoat film 2 by a sputtering method. In the manufacture of the magnetic recording medium shown in FIG. 5, a magnetizing stabilization film 9 is formed between a perpendicular magnetic film 5 and a protective film 6 by a sputtering method.

Figure 6A:
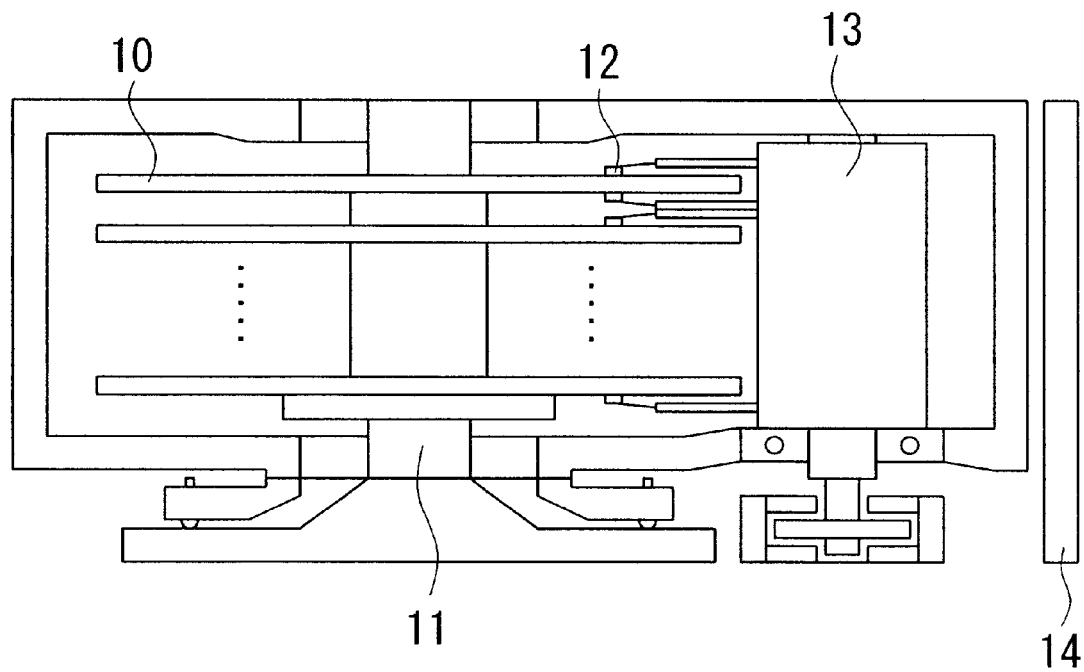
FIG. 6A is a schematic structural view showing an example of a magnetic read/write apparatus of the present invention.

FIG. 6 is a sectional structural view showing an example of the magnetic read/write apparatus according to the present invention. The magnetic read/write apparatus shown in this drawing comprises a magnetic recording medium 10 having the construction described above, a medium drive unit 11 that rotates this magnetic recording medium 10, a magnetic head 12 that carries out recording and read back of the information on the magnetic recording medium 10, a head drive unit 13, and a read/write signal processing system 14. The read/write signal processing system 14 sends a recording signal to the magnetic head 12 after processing the input data, and outputs the data after processing the read back signal from the magnetic head 12.

Examples of the magnetic bead 12 include a single pole type head for perpendicular recording.

Figure 6B:
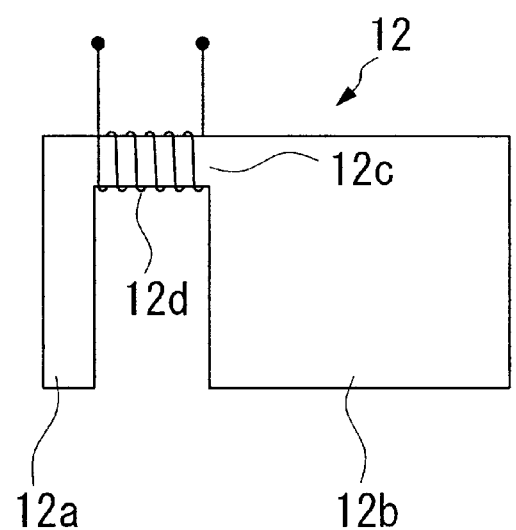
FIG. 6B shows a magnetic head available in the apparatus shown in FIG. 6A.

As shown in FIG. 6B, as the single pole type head, a single pole type head with a construction comprising a main magnetic pole 12a, an auxiliary magnetic pole 12b and a coil 12d provided at a connection unit 12c that connects these magnetic poles can be preferably used.

According to the magnetic read/write apparatus described above, since the magnetic recording medium 10 is used, the thermal stability and read/write characteristics can be enhanced.

Therefore, it becomes possible to avoid problems such as data loss and to increase high recording density.

In the following, examples are shown, and the actions and effects of the present invention are made clear. However, the present invention is not limited to the following examples.

WORKING EXAMPLE 1

A washed glass substrate (external diameter of 2.5 inches manufactured by Ohara Co.) was set in the film formation chamber of a DC magnetron sputtering apparatus (ANELVA, C-3010), and after evacuating air in the film formation chamber up to an ultimate vacuum of $1 \times 10^{-5}$ Pa, a soft magnetic undercoat film 2 (thickness: 100 nm) was formed on the glass substrate using a target comprising 89Co—4Zr—7Nb (Co content: 89 at %, Zr content: 4 at %, Nb content: 7 at %) at a substrate temperature of 100° C. or lower. Using a vibrating sample magnetometer (VSM), it was confirmed that Bs·t, that is, the product of the saturation magnetic flux density Bs of this film and the film thickness t, was 110 (T·nm).

After heating the substrate to 200° C., an orientation control film 3 having a thickness of 20 nm was formed on the soft magnetic undercoat film 2 using an Ru target and an intermediate film 4 having a thickness of 5 nm was formed thereon using a 65Co—30Cr—5B target, and then a perpendicular magnetic film 5 having a thickness of 25 nm was formed thereon using a 59Co—22Cr—17Pt—2Cu target. In the sputtering step, a film was formed under a pressure of 0.5 Pa using argon as a process gas for forming a film.

Next, a protective film 6 having a thickness of 5 nm was formed by a CVD method.

Next, a lubricating film 7 made of perfluoropolyether was formed by a dip coating method to obtain a magnetic recording medium (see Table 2).

WORKING EXAMPLES 2 TO 15

In the same manner as in Working Example 1, except that the composition or thickness of the perpendicular magnetic film 5 was changed, magnetic recording media were manufactured (see Table 2).

COMPARATIVE EXAMPLE 1

In the same manner as in Working Example 1, except that the perpendicular magnetic film 5 (thickness: 25 nm) was formed using a 61Co—22Cr—17Pt target, a magnetic recording medium was manufactured (see Table 2).

COMPARATIVE EXAMPLES 2 TO 7

In the same manner as in Working Example 1, except for selecting the conditions of the perpendicular magnetic film 5 as shown in Table 2, magnetic recording media were manufactured (see Table 2).

With respect to magnetic recording media of these Working Examples and Comparative Example, read/write characteristics and thermal stability were evaluated. The evaluation was conducted using a read write analyzer RWA1632 manufactured by the GUZIK Co. and a spin stand S1701MP.

In the evaluation of magnetic characteristics, measurements were conducted at a recording frequency of 520 kFCI using a magnetic head wherein a single magnetic pole head is used at the writing portion and a GMR element is used at the read back portion.

The evaluation of the thermal stability was made by calculating the decrease rate (%/decade) of the read back output after writing at a track recording density of 50 kFCI under the conditions of 70° C. based on $(S_0-S) \times 100/(S_0 \times 3)$. In this equation, $S_0$ denotes the read back output when one second has passed after the signal recording onto the magnetic recording medium, and S denotes the read back output after 1000 seconds. The above value is an index of the thermal stability.

These test results are shown in Table 2.

TABLE 2

| | SOFT MAGNETIC UNDERCOAT FILM | | ORIENTATION CONTROL FILM | | | PERPENDICULAR MAGNETIC FILM | |
|---|---|---|---|---|---|---|---|
| | COMPOSITION (at %) | Bs · t (T · nm) | COMPOSITION (at %) | THICKNESS (nm) | INTERMEDIATE FILM | COMPOSITION (at %) | THICKNESS (nm) |
| Working Example 1 | CoZrNb | 110 | Ru | 20 | *1 | 59Co—22Cr—17Pt—2Cu | 25 |

TABLE 2-continued

| | | | | | | | |
|---|---|---|---|---|---|---|---|
| Working Example 2 | CoZrNb | 110 | Ru | 20 | *1 | 60.8Co—22Cr—17Pt—0.2Cu | 25 |
| Working Example 3 | CoZrNb | 110 | Ru | 20 | *1 | 58.2Co—22Cr—17Pt—2.8Cu | 25 |
| Working Example 4 | CoZrNb | 110 | Ru | 20 | *1 | 57.2Co—22Cr—17Pt—3.8Cu | 25 |
| Working Example 5 | CoZrNb | 110 | Ru | 20 | *1 | 55Co—24Cr—17Pt—2Cu | 25 |
| Working Example 6 | CoZrNb | 110 | Ru | 20 | *1 | 64Co—17Cr—17Pt—2Cu | 25 |
| Working Example 7 | CoZrNb | 110 | Ru | 20 | *1 | 58Co—21Cr—17Pt—2Cu—2B | 25 |
| Working Example 8 | CoZrNb | 110 | Ru | 20 | *1 | 56.5Co—21Cr—17Pt—2Cu—3.5B | 25 |
| Working Example 9 | CoZrNb | 110 | Ru | 20 | *1 | 58Co—21Cr—17Pt—2Cu—2Ta | 25 |
| Working Example 10 | CoZrNb | 110 | Ru | 20 | *1 | 58Co—21Cr—17Pt—2Cu—1B—1Ta | 25 |
| Working Example 11 | CoZrNb | 110 | Ru | 20 | *1 | 63Co—21Cr—15Pt—2Cu | 25 |
| Working Example 12 | CoZrNb | 110 | Ru | 20 | *1 | 54Co—21Cr—23Pt—2Cu | 25 |
| Working Example 13 | CoZrNb | 110 | Ru | 20 | *1 | 59Co—22Cr—17Pt—2Cu | 5 |
| Working Example 14 | CoZrNb | 110 | Ru | 20 | *1 | 59Co—22Cr—17Pt—2Cu | 55 |
| Working Example 15 | CoZrNb | 110 | Ru | 20 | *1 | 59Co—22Cr—17Pt—2Cu | 100 |
| Comparative Example 1 | CoZrNb | 110 | Ru | 20 | *1 | 61Co—22Cr—17Pt | 25 |
| Comparative Example 2 | CoZrNb | 110 | Ru | 20 | *1 | 66Co—17Cr—17Pt | 25 |
| Comparative Example 3 | CoZrNb | 110 | Ru | 20 | *1 | 57.2Co—22Cr—17Pt—5Cu | 25 |
| Comparative Example 4 | CoZrNb | 110 | Ru | 20 | *1 | 66Co—15Cr—17Pt—2Cu | 25 |
| Comparative Example 5 | CoZrNb | 110 | Ru | 20 | *1 | 54Co—25Cr—17Pt—2Cu | 25 |
| Comparative Example 6 | CoZrNb | 110 | Ru | 20 | *1 | 70Co—22Cr—6Pt—2Cu | 25 |
| Comparative Example 7 | CoZrNb | 110 | Ru | 20 | *1 | 50Co—22Cr—26Pt—2Cu | 25 |

| | READ/WRITE CHARACTERISTICS ERROR RATE | THERMAL STABILITY | MAGNETOSTATIC CHARACTERISTICS | | |
|---|---|---|---|---|---|
| | $(10^{-X})$ | (%/DECADE) | Hc (Oe) | Mr/Ms | −Hn (Oe) |
| Working Example 1 | 5.6 | −0.5 | 4490 | 0.98 | 1220 |
| Working Example 2 | 5.3 | −0.7 | 4000 | 0.92 | 670 |
| Working Example 3 | 5.4 | −0.5 | 4220 | 0.95 | 960 |
| Working Example 4 | 5.1 | −0.9 | 4200 | 0.90 | 900 |
| Working Example 5 | 6.9 | −1.7 | 3850 | 0.86 | 150 |
| Working Example 6 | 4.2 | −0.1 | 4380 | 1.00 | 2100 |
| Working Example 7 | 6.1 | −0.7 | 4100 | 0.95 | 700 |
| Working Example 8 | 6.0 | −0.8 | 3900 | 0.90 | 400 |
| Working Example 9 | 5.8 | −0.6 | 4080 | 0.90 | 400 |
| Working Example 10 | 6.0 | −0.6 | 4210 | 0.95 | 810 |
| Working Example 11 | 5.8 | −0.9 | 4300 | 0.91 | 720 |
| Working Example 12 | 5.3 | −0.9 | 3880 | 0.92 | 660 |
| Working Example 13 | 5.0 | −1.2 | 3550 | 0.86 | 150 |
| Working Example 14 | 5.3 | −0.4 | 4150 | 0.92 | 860 |
| Working Example 15 | 4.1 | −0.3 | 3780 | 0.88 | 660 |
| Comparative Example 1 | 5.2 | −1.8 | 3700 | 0.83 | — |
| Comparative Example 2 | 3.8 | −0.4 | 3800 | 1.00 | 1600 |
| Comparative Example 3 | 4.0 | −1.9 | 3450 | 0.88 | 380 |
| Comparative Example 4 | 2.2 | −0.2 | 3880 | 1.00 | 2010 |
| Comparative Example 5 | 4.8 | −1.8 | 3020 | 0.77 | — |
| Comparative Example 6 | 4.8 | −2.5 | 1980 | 0.55 | — |
| Comparative Example 7 | 2.0 | −1.8 | 2010 | 0.70 | — |

*1 INTERMEDIATE FILM: 65Co—30Cr—5B (thickness: 5 nm)

As is apparent from Table 2, in Working Examples using a CoCrPtCu alloy having a Cr content of 16 to 24 at %, a Pt content of 14 to 24 at % and a Cu content of 0.1 to 4 at % in the perpendicular magnetic film 5, excellent read/write characteristics and excellent thermal stability were obtained.

WORKING EXAMPLES 16 TO 18

Using a perpendicular magnetic film 5 having a two-layer structure and using a CoCrPtCu alloy in either of the two layers, magnetic recording media were manufactured (see Table 3).

In Table 3, the composition of the perpendicular magnetic film 5 is indicated by the "composition of the lower layer/composition of the upper layer". Also the thickness is indicated by the "thickness of the lower layer/thickness of the upper layer".

COMPARATIVE EXAMPLE 8

In the same manner as in Working Example 1, except for selecting the conditions of the perpendicular magnetic film 5 as shown in Table 3, magnetic recording media were manufactured (see Table 3).

With respect to magnetic recording media of these Working Examples and Comparative Example, read/write characteristics and thermal stability were evaluated. These test results are shown in Table 3.

having a layer, which has a Cr content of 16 to 24 at %, a Pt content of 14 to 24 at % and a Cu content of 0.1 to 4 at %, exhibit excellent read/write characteristics as compared with Comparative Examples in which a CoCrPtCu alloy is not used.

WORKING EXAMPLES 19 TO 25

In the same manner as in Working Example 1, except for selecting the composition of the soft magnetic undercoat film 2 as shown in Table 4, magnetic recording media were manufactured (see Table 4).

With respect to magnetic recording media of these Working Examples, read/write characteristics and thermal stability were evaluated. These test results are shown in Table 4.

TABLE 3

| | SOFT MAGNETIC UNDERCOAT FILM | | ORIENTATION | INTER- | PERPENDICULAR MAGNETIC FILM | |
|---|---|---|---|---|---|---|
| | COMPOSITION (at %) | Bs · t (T · nm) | CONTROL FILM | MEDIATE FILM | COMPOSITION (at %) | THICKNESS (nm) |
| Working Example 1 | CoZrNb | 110 | *1 | *2 | 59Co—22Cr—17Pt—2Cu | 25 |
| Working Example 16 | CoZrNb | 110 | *1 | *2 | 59Co—22Cr—17Pt—2Cu/63Co—20Cr—15Pt—2B | 15/10 |
| Working Example 17 | CoZrNb | 110 | *1 | *2 | 63Co—20Cr—15Pt—2B/59Co—22Cr—17Pt—2Cu | 10/15 |
| Working Example 18 | CoZrNb | 110 | *1 | *2 | 59Co—22Cr—17Pt—2Cu/63Co—20Cr—15Pt—2B | 3/22 |
| Comparative Example 8 | CoZrNb | 110 | *1 | *2 | 63Co—22Cr—17Pt/63Co—20Cr—15Pt—2B | 25 |

| | READ/WRITE CHARACTERISTICS ERROR RATE | THERMAL STABILITY | MAGNETOSTATIC CHARACTERISTICS | | |
|---|---|---|---|---|---|
| | $(10^{-x})$ | (%/DECADE) | Hc (Oe) | Mr/Ms | −Hn (Oe) |
| Working Example 1 | 5.6 | −0.5 | 4490 | 0.98 | 1220 |
| Working Example 16 | 5.8 | −0.7 | 4490 | 0.98 | 900 |
| Working Example 17 | 5.8 | −0.7 | 4300 | 0.95 | 900 |
| Working Example 18 | 5.7 | −0.8 | 4000 | 0.92 | 480 |
| Comparative Example 8 | 5.4 | −2.4 | 3500 | 0.80 | — |

*1 ORIENTATION CONTROL FILM: Ru (thickness: 20 nm)
*2 INTERMEDIATE FILM: 65Co—30Cr—5B (thickness: 5 nm)

As is apparent from Table 3, Working Examples using a CoCrPtCu alloy to form a perpendicular magnetic film 5

TABLE 4

| | SOFT MAGNETIC UNDERCOAT FILM | | ORIENTATION | INTERMEDIATE | PERPENDICULAR MAGNETIC FILM | |
|---|---|---|---|---|---|---|
| | COMPOSITION (at %) | Bs · t (T · nm) | CONTROL FILM | FILM | COMPOSITION (at %) | THICKNESS (nm) |
| Working Example 1 | CoZrNb | 110 | *1 | *2 | 59Co—22Cr—17Pt—2Cu | 25 |
| Working Example 19 | CoTaZr | 110 | *1 | *2 | 59Co—22Cr—17Pt—2Cu | 25 |
| Working Example 20 | FeAlSi | 110 | *1 | *2 | 59Co—22Cr—17Pt—2Cu | 25 |

TABLE 4-continued

| | | | | | | |
|---|---|---|---|---|---|---|
| Working Example 21 | FeTaC | 110 | *1 | *2 | 59Co—22Cr—17Pt—2Cu | 25 |
| Working Example 22 | FeAlO | 110 | *1 | *2 | 59Co—22Cr—17Pt—2Cu | 25 |
| Working Example 23 | CoZrNb | 5 | *1 | *2 | 59Co—22Cr—17Pt—2Cu | 25 |
| Working Example 24 | CoZrNb | 20 | *1 | *2 | 59Co—22Cr—17Pt—2Cu | 25 |
| Working Example 25 | CoZrNb | 400 | *1 | *2 | 59Co—22Cr—17Pt—2Cu | 25 |

| | READ/WRITE CHARACTERISTICS ERROR RATE | THERMAL STABILITY | MAGNETOSTATIC CHARACTERISTICS | | |
|---|---|---|---|---|---|
| | $(10^{-X})$ | (%/DECADE) | Hc (Oe) | Mr/Ms | −Hn (Oe) |
| Working Example 1 | 5.6 | −0.5 | 4490 | 0.98 | 1220 |
| Working Example 19 | 5.5 | −0.6 | 4330 | 0.98 | 1000 |
| Working Example 20 | 5.3 | −0.6 | 4300 | 0.95 | 1050 |
| Working Example 21 | 5.7 | −0.5 | 4290 | 0.93 | 1080 |
| Working Example 22 | 5.8 | −0.7 | 4500 | 0.93 | 1310 |
| Working Example 23 | 5.0 | −0.6 | 4300 | 0.91 | 1110 |
| Working Example 24 | 5.5 | −0.5 | 4420 | 0.97 | 1200 |
| Working Example 25 | 5.6 | −0.6 | 4510 | 0.96 | 1180 |

*1 ORIENTATION CONTROL FILM: Ru (thickness: 20 nm)
*2 INTERMEDIATE FILM: 65Co—30Cr—5B (thickness: 5 nm)

As is apparent from Table 4, in all Working Examples, excellent read/write characteristics could be obtained.

WORKING EXAMPLES 26 TO 30

In the same manner as in Working Example 1, except for selecting the material and the thickness of the orientation control film 3 as shown in Table 5, magnetic recording media were manufactured (see Table 5).

With respect to magnetic recording media of these Working Examples, read/write characteristics and thermal stability were evaluated. These test results are shown in Table 5.

TABLE 5

| | SOFT MAGNETIC UNDERCOAT FILM | | ORIENTATION CONTROL FILM | | | INTERMEDIATE FILM | PERPENDICULAR MAGNETIC FILM | |
|---|---|---|---|---|---|---|---|---|
| | COMPO-SITION | Bs · t (T · nm) | COMPO-SITION | THICKNESS (nm) | STRUCTURE | | COMPOSITION (at %) | THICKNESS (nm) |
| Working Example 1 | CoZrNb | 110 | Ru | 20 | hcp | *1 | 59Co—22Cr—17Pt—2Cu | 25 |
| Working Example 26 | CoZrNb | 110 | RuCr | 20 | hcp | *1 | 59Co—22Cr—17Pt—2Cu | 25 |
| Working Example 27 | CoZrNb | 110 | Hf | 20 | hcp | *1 | 59Co—22Cr—17Pt—2Cu | 25 |
| Working Example 28 | CoZrNb | 110 | NiB | 20 | fcc | *1 | 59Co—22Cr—17Pt—2Cu | 25 |
| Working Example 29 | CoZrNb | 110 | Pd | 20 | fcc | *1 | 59Co—22Cr—17Pt—2Cu | 25 |
| Working Example 30 | CoZrNb | 110 | CoZr | 20 | amorphous | *1 | 59Co—22Cr—17Pt—2Cu | 25 |

| | READ/WRITE CHARACTERISTICS ERROR RATE | THERMAL STABILITY | MAGNETOSTATIC CHARACTERISTICS | | |
|---|---|---|---|---|---|
| | $(10^{-X})$ | (%/DECADE) | Hc (Oe) | Mr/Ms | −Hn (Oe) |
| Working Example 1 | 5.6 | −0.5 | 4490 | 0.98 | 1220 |
| Working Example 26 | 5.5 | −0.6 | 4330 | 0.98 | 1000 |
| Working Example 27 | 5.3 | −0.6 | 4300 | 0.95 | 1050 |
| Working Example 28 | 5.7 | −0.5 | 4290 | 0.93 | 1080 |
| Working Example 29 | 5.0 | −0.6 | 4300 | 0.91 | 1110 |
| Working Example 30 | 5.6 | −0.6 | 4510 | 0.96 | 1180 |

*1 INTERMEDIATE FILM: 65Co—30Cr—5B (thickness: 5 nm)

As is apparent from Table 5, excellent read/write characteristics could be obtained by a construction using a material having an hcp structural, fcc structure, or amorphous structure in the orientation control film 3.

WORKING EXAMPLES 31 TO 33

In the same manner as in Working Example 1, except that the soft magnetic undercoat film 2 was oxidized by exposing the surface thereof to an oxygen-containing gas (pure oxygen (100% $O_2$), 50% $O_2$–50% Ar, or air), magnetic recording media were manufactured (see Table 6).

With respect to magnetic recording media of these Working Examples, read/write characteristics and thermal stability were evaluated. These test results are shown in Table 6.

WORKING EXAMPLES 34 TO 40

In the same manner as in Working Example 1, except for selecting the material and the thickness of the intermediate film 4 as shown in Table 7, magnetic recording media were manufactured (see Table 7).

With respect to magnetic recording media of these Working Examples, read/write characteristics and thermal stability were evaluated. These test results are shown in Table 7.

TABLE 6

| | SOFT MAGNETIC UNDERCOAT FILM | | | | ORIENTATION CONTROL FILM | | INTERMEDIATE FILM |
|---|---|---|---|---|---|---|---|
| | COMPO-SITION | Bs · t (T · nm) | EXPOSURE GAS | OXIDIZED LAYER (nm) | COMPO-SITION | THICKNESS (nm) | |
| Working Example 1 | CoZrNb | 110 | — | — | Ru | 20 | *1 |
| Working Example 31 | CoZrNb | 110 | 100% $O_2$ | 2 | Ru | 20 | *1 |
| Working Example 32 | CoZrNb | 110 | 50% $O_2$—50% Ar | 1 | Ru | 20 | *1 |
| Working Example 33 | CoZrNb | 110 | ATMOSPHERIC AIR | 2 | Ru | 20 | *1 |

| | PERPENDICULAR MAGNETIC FILM | | READ/WRITE CHARACTERISTICS | THERMAL STABILITY | MAGNETOSTATIC CHARACTERISTICS | | |
|---|---|---|---|---|---|---|---|
| | COMPOSITION (at %) | THICKNESS (nm) | ERROR RATE ($10^{-x}$) | (%/DECADE) | Hc (Oe) | Mr/Ms | −Hn (Oe) |
| Working Example 1 | 59Co—22Cr—17Pt—2Cu | 25 | 5.6 | −0.5 | 4490 | 0.98 | 1220 |
| Working Example 31 | 59Co—22Cr—17Pt—2Cu | 25 | 6.2 | −0.6 | 4530 | 0.98 | 1000 |
| Working Example 32 | 59Co—22Cr—17Pt—2Cu | 25 | 6.1 | −0.6 | 4500 | 0.96 | 1050 |
| Working Example 33 | 59Co—22Cr—17Pt—2Cu | 25 | 6.4 | −0.5 | 4690 | 0.99 | 1330 |

*1 INTERMEDIATE FILM 65Co—30Cr—5B (thickness: 5 nm)

As is apparent from Table 6, excellent read/write characteristics could be obtained by oxidizing the soft magnetic undercoat film 2.

TABLE 7

| | SOFT MAGNETIC UNDERCOAT FILM | | ORIENTATION CONTROL FILM | INTERMEDIATE FILM | | PERPENDICULAR MAGNETIC FILM |
|---|---|---|---|---|---|---|
| | COMPOSITION (at %) | Bs · t (T · nm) | | COMPOSITION (at %) | THICKNESS (nm) | |
| Working Example 1 | CoZrNb | 110 | *1 | 65Co—30Cr—5B | 5 | *2 |
| Working Example 34 | CoZrNb | 110 | *1 | 65Co—30Cr—5Pt | 5 | *2 |
| Working Example 35 | CoZrNb | 110 | *1 | 54Co—28Cr—10Pt—8B | 5 | *2 |
| Working Example 36 | CoZrNb | 110 | *1 | 60Co—40Ru | 5 | *2 |
| Working Example 37 | CoZrNb | 110 | *1 | 55Co—45B | 5 | *2 |

TABLE 7-continued

| | | | | | | | |
|---|---|---|---|---|---|---|---|
| Working Example 38 | CoZrNb | 110 | *1 | — | | — | *2 |
| Working Example 39 | CoZrNb | 110 | *1 | 65Co—30Cr—5B | | 15 | *2 |
| Working Example 40 | CoZrNb | 110 | *1 | 65Co—30Cr—5B | | 40 | *2 |

| | READ/WRITE CHARACTERISTICS ERROR RATE | THERMAL STABILITY | MAGNETOSTATIC CHARACTERISTICS | | |
|---|---|---|---|---|---|
| | $(10^{-X})$ | (%/DECADE) | Hc (Oe) | Mr/Ms | −Hn (Oe) |
| Working Example 1 | 5.6 | −0.5 | 4490 | 0.98 | 1220 |
| Working Example 34 | 5.4 | −0.6 | 4330 | 0.97 | 1020 |
| Working Example 35 | 5.9 | −0.6 | 4300 | 0.95 | 1100 |
| Working Example 36 | 5.6 | −0.5 | 4290 | 0.96 | 1210 |
| Working Example 37 | 5.8 | −0.6 | 4500 | 0.93 | 1260 |
| Working Example 38 | 5.2 | −0.9 | 4010 | 0.91 | 660 |
| Working Example 39 | 5.2 | −0.4 | 4720 | 0.97 | 1350 |
| Working Example 40 | 4.6 | −0.4 | 4740 | 0.98 | 1300 |

*1 ORIENTATION CONTROL FILM: Ru (thickness: 20 nm)
*2 PERPENDICULAR MAGNETIC FILM 59Co—22Cr—17Pt—2Cu (thickness: 25 nm)

As is apparent from Table 7, in all Working Examples, excellent read/write characteristics could be obtained.

TABLE 8

| | HARD MAGNETIC FILM | | SOFT MAGNETIC UNDERCOAT FILM | | ORIENTATION CONTROL FILM | | |
|---|---|---|---|---|---|---|---|
| | COMPOSITION | THICKNESS (nm) | COMPOSITION | Bs · t (T · nm) | COMPOSITION (at %) | THICKNESS (nm) | INTERMEDIATE FILM |
| Working Example 1 | — | — | CoZrNb | 110 | Ru | 20 | *1 |
| Working Example 41 | 64Co—20Cr—14Pt—2Cu | 50 | CoZrNb | 110 | Ru | 20 | *1 |
| Working Example 42 | 64Co—20Cr—14Pt—2Cu | 150 | CoZrNb | 110 | Ru | 20 | *1 |
| Working Example 43 | 84Co—16Sm | 50 | CoZrNb | 110 | Ru | 20 | *1 |

| | PERPENDICULAR MAGNETIC FILM | READ/WRITE CHARACTERISTICS ERROR RATE $(10^{-X})$ | THERMAL STABILITY (%/DECADE) | MAGNETOSTATIC CHARACTERISTICS | | | SPIKE NOISE |
|---|---|---|---|---|---|---|---|
| | | | | Hc (Oe) | Mr/Ms | −Hn (Oe) | |
| Working Example 1 | *2 | 5.6 | −0.5 | 4490 | 0.98 | 1220 | *3 |
| Working Example 41 | *2 | 5.5 | −0.6 | 4380 | 0.97 | 1100 | NONE |
| Working Example 42 | *2 | 5.5 | −0.5 | 4330 | 0.95 | 1150 | NONE |
| Working Example 43 | *2 | 5.3 | −0.6 | 4440 | 0.96 | 1180 | NONE |

*1 INTERMEDIATE FILM: 65Co—30Cr—5B (thickness: 5 nm)
*2 PERPENDICULAR MAGNETIC FILM 59Co—22Cr—17Pt—2Cu (thickness: 25 nm)
*3 SLIGHT SPIKE NOISE GENERATED AT OUTER PERIPHERY

WORKING EXAMPLES 41 TO 43

In the same manner as in Working Example 1, except that an undercoat film (thickness: 20 nm) made of 94Cr—6Mo was provided between the non-magnetic substrate 1 and the soft magnetic undercoat film 2 and a hard magnetic film 8 shown in Table 8 was provided thereon, magnetic recording media were manufactured (see Table 8).

With respect to magnetic recording media of these Working Examples, read/write characteristics and thermal stability were evaluated. These test results are shown in Table 8.

As is apparent from Table 8, spike-like noise caused by a magnetic wall in the soft magnetic undercoat film 2 could be suppressed and read/write characteristics could be improved without deteriorating the read/write characteristics by providing the hard magnetic film 8.

What is claimed is:
1. A magnetic recording medium comprising:
an orientation control film that controls the orientation of a film provided directly thereabove, a perpendicular magnetic film, of which the axis of easy magnetization is generally oriented perpendicular to a non-magnetic substrate, and a protective film, that are provided on the non-magnetic substrate, wherein the perpendicular magnetic film is made of a material which contains Co, Cr, Pt and Cu, the Cr content being 16 at % to 24 at % and the Cu content being 0.1 at % to 4 at %, and a coercive force (Hc) of the perpendicular magnetic film being at least 3000 (Oe), negative nucleation field (−Hn) being 0 (Oe) to 2500 (Oe), and a ratio of residual magnetization (Mr) to saturation magnetization (Ms) being at least 0.85.

2. The magnetic recording medium according to claim 1, wherein the perpendicular magnetic film has a Cr content from 18 at % to 24 at %, a Pt content from 14 at % to 24 at %, and a Cu content from 0.1 at % to 3 at %.

3. The magnetic recording medium according to claims 1, wherein the perpendicular magnetic film comprises at least one of CoCrPtCu alloy, CoCrPtCuTa alloy, CoCrPtCuB alloy and CoCrPtCuTaB alloy.

4. The magnetic recording medium according to claims 1, wherein a hard magnetic film made of a hard magnetic material is provided between the non-magnetic substrate and the soft magnetic undercoat film.

5. The magnetic recording medium according to claims 1, wherein a magnetizing stabilization film made of a soft magnetic material is provided above the perpendicular magnetic film.

6. A method of manufacturing a magnetic recording medium, which comprises forming at least an orientation control film that controls the orientation of a film provided directly thereabove, a perpendicular magnetic film of which axis of easy magnetization is generally oriented perpendicular to a non-magnetic substrate, and a protective film, on the non-magnetic substrate, while controlling so that the perpendicular magnetic film is made of a material which contains Co, Cr, Pt and Cu, the Cr content is 16 at % to 24 at % and the Cu content is 0.1 at % to 4 at %, and that a coercive force (Hc) of the perpendicular magnetic film is at least 3000 (Oe), negative nucleation field (−Hn) is 0 (Oe) to 2500 (Oe), and a ratio of residual magnetization (Mr) to saturation magnetization (Ms) is at least 0.85.

7. A magnetic read/write apparatus comprising a magnetic recording medium and a magnetic head that records information on the magnetic recording medium and reads back the information, wherein the magnetic head is a single pole type head and the magnetic recording medium comprises at least an orientation control film that controls the orientation of a film provided directly thereabove, a perpendicular magnetic film, of which the axis of easy magnetization is generally oriented perpendicular to a non-magnetic substrate, and a protective film, that are provided on the non-magnetic substrate, wherein the perpendicular magnetic film is made of a material which contains Co, Cr, Pt and Cu, the Cr content being 16 at % to 24 at % and the Cu content being 0.1 at % to 4 at %, and a coercive force (Hc) of the perpendicular magnetic film being at least 3000 (Oe), negative nucleation field (−Hn) being 0 (Oe) to 2500 (Oe), and a ratio of residual magnetization (Mr) to saturation magnetization (Ms) is at least 0.85.

* * * * *